United States Patent [19]

Chan et al.

[11] Patent Number: 5,049,213

[45] Date of Patent: Sep. 17, 1991

[54] PLASTIC BONDED EXPLOSIVES USING FLUOROCARBON BINDERS

[75] Inventors: May L. Chan; Russell Reed, Jr.; Herb G. Gollmar, all of Ridgecrest, Calif.; Carl Gotzmer, Accokeek; Robert C. Gill, White Plains, both of Md.

[73] Assignee: The United States of America as represented by the Secretary of the Navy, Washington, D.C.

[21] Appl. No.: 791,548

[22] Filed: Oct. 10, 1985

[51] Int. Cl.$^5$ .............................................. C06B 45/10
[52] U.S. Cl. .................................... 149/19.3; 149/19.4
[58] Field of Search ............................... 149/19.3, 19.4

[56] References Cited

U.S. PATENT DOCUMENTS

| | | | |
|---|---|---|---|
| 3,296,041 | 1/1967 | Wright | 149/19.3 |
| 3,629,020 | 12/1971 | Kaufman et al. | 149/19.3 |
| 3,640,070 | 2/1972 | Kaufman et al. | 149/19.3 |
| 3,642,705 | 2/1972 | Zollinger | 149/19.3 |
| 3,647,891 | 3/1972 | Loudas et al. | 149/19.3 |
| 3,728,170 | 4/1973 | Stott et al. | 149/19 |
| 3,922,311 | 11/1975 | Peters et al. | 260/615 |
| 3,972,856 | 8/1976 | Mitsch et al. | 149/19.3 |
| 4,013,491 | 3/1977 | Shaw et al. | 149/19.3 |
| 4,023,995 | 5/1977 | Reed et al. | 149/19.3 |
| 4,131,499 | 12/1978 | Flanigan | 149/19.3 |
| 4,392,895 | 7/1983 | Reed et al. | 149/19.3 |
| 4,394,197 | 7/1983 | Kabik et al. | 149/19.3 |
| 4,554,031 | 11/1985 | Kerviel et al. | 149/19.3 |

*Primary Examiner*—Edward A. Miller
*Attorney, Agent, or Firm*—Stephen J. Church; Melvin J. Sliwka; Sol Sheinbein

[57] ABSTRACT

A high energy, thermally stable plastic bonded explosive comprising HMX, a plasticizer and a fluoroalkyl acrylate or urethane fluorocarbon binder.

8 Claims, No Drawings

PLASTIC BONDED EXPLOSIVES USING FLUOROCARBON BINDERS

BACKGROUND OF THE INVENTION

1. Field of the Invention

This invention relates to plastic bonded explosives. More particularly, this invention relates to high energy, thermally stable plastic bonded explosives. Still more particularly, but without limitation thereto, this invention relates to the use of fluorocarbon binders in plastic bonded explosives.

2. Description of the Prior Art

Energetic materials characterized by high density, enhanced heat release and minimized hazard properties are highly desirable. They are needed for reasons not only of enhanced energy, but also for high thermal stability. In the past, efforts to attain such characteristics as those recited included incorporating high levels of dense metals such as zirconium and using various energetic plasticizers such as nitrate, fluorodinitro or difluoroamino substituted plasticizers. The disadvantages are that most of these have relatively poor thermal stability, undesirable aging properties and in some cases, hazardous processing.

SUMMARY OF THE INVENTION

An object of this invention is to provide a high energy, thermally stable plastic bonded explosive.

A further object of the invention is to provide a high energy explosive with the addition of a fluorocarbon binder.

Yet another object of the invention resides in a plastic bonded explosive characterized as deformable.

These and other objects have been demonstrated by the present invention wherein a plastic bonded explosive is comprised of a solid explosive filler, a plasticizer and an acrylate or urethane fluorocarbon binder.

DESCRIPTION OF THE PREFERRED EMBODIMENT

The use of fluorocarbon polymers to achieve high density plastic bonded explosives is one of the most promising approaches due to their much higher densities (1,58-1,86 g/cc), superior thermal stability and chemical inertness.

The general composition of a cast cured, rubbery binder plastic bonded explosive (PBX) is as follows: a binder, a plasticizer and a solid explosive filler. This invention utilizes cyclotetramethylene tetranitramine (HMX) or cyclotrimethylene trinitramine (RDX) as the explosive filler.

The binder used is a fluorocarbon polymer. Like conventional inert binders, fluorocarbon binders are rubbery and liquid curable. However, fluorocarbon binders have higher performance due to their density and is slight exothermicity involved in the fluorocarbon reaction with water to form HF and CO. The fluorocarbons used in this invention are selected from fluoroalkyl acrylates and urethanes.

There are three fluoroalkyl acrylates suitable for use as a PBX binder. Perfluorooctyl acrylate (I) has the following structure:

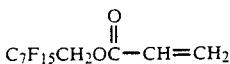

The second acrylate is 1,1,7-trihydro-2,2,3,3,4,4,5,5,6,6,7,7-dodecafluoroheptyl acrylate having the following structure:

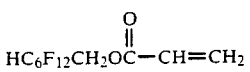

The third acrylate is 2-(N-butylperfluorooctanesulfonamide)ethyl acrylate (III) and has the following structure:

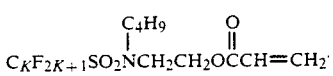

where K is about 7.5.

These fluoroacrylate monomers are readily polymerized by using any of the following catalysts/curing agents: benzoyl peroxide, t-butyl perbenzoate and t-butyl peroctoate cocatalyzed by dimethylaniline or cobaltous acetylacetonate. The most desirable cure is obtained at ambient temperature with the t-butyl peroctoate/cobaltous acetylacetonate combination. Benzoyl peroxide is an effective catalyst at 60°-70° C.

There are two hydroxyl-terminated fluorocarbon prepolymers suitable for use as a PBX binder, a hydroxyl-terminated random perfluorocopolyether (IV) has the following general structure:

$$HOCH_2(CF_2O)_m(CF_2CF_2O)_nCH_2OH \qquad (IV)$$

where m=n such that the polymer has a molecular weight of about 2000. The second prepolymer is the hydroxyl-terminated random copolymer of vinylidene fluoride and hexafluoropropylene (V) with the following general structure:

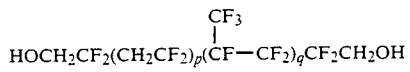

where p=q such that the polymer has a molecular weight of about 3600.

Conventional isocyanates such as isophorone diisocyanate, toluene diisocyanate, and the biuret trimer of hexamethylene diisocyanate are suitable curatives for the compostion of formula (V). Fluorinated isocyantates such as a perfluoroether diisocyanate may be used to cure either of the above described systems. Another fluoro-containing isocyanate is the reaction product of the biuret trimer of hexamethylene diisocyanate and 1,1-dihydroperfluorooctyl alcohol. The fluoroalcohol is added to the trimer in the proportion of 0.3 equivalent of fluoroalcohol to 1.0 equivalent of trimer, and the mixture is stirred under nitrogen at room temperature. Since each mole of trimer contains over three isocyanate functional groups, the adduct has over two free isocyanate functionalities to react with the hydroxyl groups of the urethane polymer. Both dibutyltin dilaurate and ferric acetylacetonate are suitable catalysts for the polymers.

Liquid plasticizers containing fluorine, which are miscible with fluorocarbon polymeric materials, are required to reduce the viscosity of the polymer (V) for processing explosives. Solubility tests indicate that IV can be plasticized with any of the following three compounds:

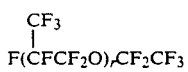

where r=10-60, commercially available as Krytox (DuPont Chemical Co.);

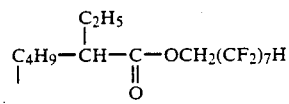

a fluorinated alkyl 2-ethyl caprylate commercially available as L-7028 (3M Co.); and polychlorotrifluoroethylenes of the general formula

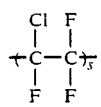

where s=10-60, commercially available as Fluorolube (Hooke Chemical and Plastic Co.).

As for (V), it is miscible with energetic fluorodinitro plasticizers such as bis(fluorodinitroethyl) formal (FEFO):

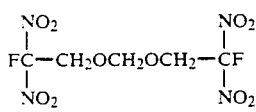

and difluoro bis(fluorodinitroethyl) formal (DFFEFO):

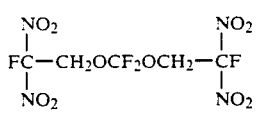

There is limited solubility however, and the optimum conditions are one part by weight plasticizer (FEFO or DFFEFO) to one part by weight binder (V).

The fluorocarbon binders contemplated by this invention are liquid curable elastomeric materials. Their properties are summarized in Table 1. They have molecular weights ranging from 386–3600, high densities (1,58-1,86 g|cc), high fluorine content (50-66%) and low glass transition temperatures (−80° to −25° C.).

TABLE 1

| PROPERTY | I | II | III | IV | V |
|---|---|---|---|---|---|
| Molecular Weight | 454 | 386 | 628 | 2000 | 3600 |
| Equivalent Weight | — | — | — | 1025 | 1800 |
| Functionality | — | — | — | 2.0 | 1.9 |
| Density, g/cc | 1.58 | 1.58 | 1.58 | 1.86 | 1.75 |
| Percent fluorine | 63 | 59 | 50 | 62 | 66 |
| $H_f$, Kcal/g | −1.7 | −1.74 | −1.7 | −1.80 | −1.80 |
| Tg, °C. | −40 to −80 | −30 to −80 | −25 | −32.5 | −55 |

Fluorocarbon polymers are known to be very thermally stable, as indicated in Table 2. The plasticizers and solids, such as HMX are comparatively less thermally stable. Therefore, in a plastic bonded explosive the thermal stability of the other ingredients is generally the limiting factor. Table 2 gives thermogravimetric analysis (TGA) and differential thermal analysis (DTG) data, along with the temperature at 1% weight loss.

TABLE 2

| BINDER | TGA onset, °K. | DTG Peaks, °K. | Temp. at 1% Weight Loss, °K. |
|---|---|---|---|
| I | 470, 575 | 622 | 502 |
| II[a] | 500 | 546 | 435 |
| III | 551 | 643 | 428 |
| IV | 378, 437, 613 | 506, 618 | 428 |
| IV[b] | 428, 503, 645 | 541, 660 | 463 |
| V | 413, 576, 706 | 698, 748 | 515 |
| V[c] | 393, 435, 608 | 488, 631 | 433 |
| V[d] | 362, 421, 570 | 543, 703 | 385 |

[a] with HMX
[b] with toluene diisocyanate curative
[c] with FEFO: the ratio of V to FEFO is 1:1
[d] with DFFEFO: the ratio of V to DFFEFO is 1:2

The calculated performance of conventional plastic bonded explosives is in the range of 250-280 kbar of detonation pressure. Use of fluorocarbon binders allows castable plastic bonded explosives to attain significantly higher calculated performance, within the range of 332-366 kbar, as is shown in Table 3.

TABLE 3

| BINDER (wt. %) | PLASTICIZER (wt. %) | HMX (wt. %) | CALCULATED PERFORMANCE, kbar |
|---|---|---|---|
| I (15) | — | 85 | 334 |
| II (15) | — | 85 | 332 |
| III (16) | — | 84 | 333 |
| IV (15) | — | 85 | 361 |
| V (15) | — | 85 | 342 |
| V (7.5) | FEFO (7.5) | 85 | 351 |
| V (7.5) | DFFEFO (7.5) | 85 | 366 |

The fluorocarbons can be formulated to yield tough plastic bonded explosives high in moduli. Either mechanical or deformable properties can be tailored since the extent of crosslinking can be adjusted readily by varying the amount of crosslinker. Chain extended polymers can be attained which have little crosslink density and therefore yield plastic bonded explosives with enhanced deformability. The addition of plasticizers enhances deformability since they also tend to lower the moduli.

This invention has been described in detail with particular reference to certain preferred embodiments thereof, but it will be understood that variations and modifications can be effected within the spirit and scope of the invention.

What is claimed is:

1. A high energy, thermally stable plastic bonded explosive comprising:
   a solid explosive filler selected from the group consisting of: cyclotetramethylene tetranitramine, and cyclotrimethylene trinitramine;
   a liquid plasticizer containing fluorine and miscible with fluorocarbon polymer materials, said plasticizer forming a plasticizer to polymer weight ratio of about 1 to 1; and
   a hydroxyl-terminated fluorocarbon binder selected from the group consisting of: hydroxyl-terminated random perfluorocopolyether having the general structure

HOH$_2$C(CF$_2$O)$_m$(CF$_2$CF$_2$O)$_n$CH$_2$OH where m=n such that the compound has a molecular weight of about 2000, and the hydroxyl-terminated random copolymer of vinylidene fluoride and hexafluoropropylene having the general structure

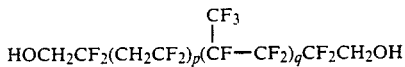
HOCH$_2$CF$_2$(CH$_2$CF$_2$)$_p$(CF—CF$_2$)$_q$CF$_2$CH$_2$OH  (with CF$_3$ branch)

where p=q such that the compound has a molecular weight of about 3600.

2. The explosive of claim 1 which further comprises an isocyanate curative selected from the group consisting of: isophorone diisocyanate, the biuret trimer of hexamethylene diisocyanate, toluene diisocyanate, hexamethylene diisocyanate, perfluoroether isocyanate and the reaction product of the biuret trimer of hexamethylene diisocyanate and 1,1-dihydroperfluorooctyl alcohol.

3. The explosive of claim 1 which further comprises a catalyst selected for the group consisting of dibutyltin dilaurate and ferric acetylacetonate.

4. The explosive of claim 1 wherein said binder is hydroxyl-terminated perfluoropolyether and said plasticizer is selected from the group consisting of:

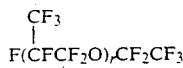
F(CFCF$_2$O)$_r$CF$_2$CF$_3$  (with CF$_3$ branch)

where r=10-60,

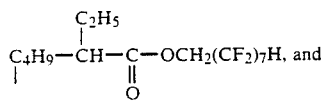
C$_4$H$_9$—CH—C—OCH$_2$(CF$_2$)$_7$H, and  (with C$_2$H$_5$ and =O)

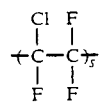

where s=10-60.

5. The explosive of claim 1 wherein said binder is the hydroxyl-terminated random copolymer of vinylidene fluoride and hexafluoropropylene and said plasticizer is selected from the group consisting of: bis(fluorodinitroethyl)formal and difluoro bis(fluorodinitroethyl)formal.

6. A high energy, thermally stable plastic bonded explosive consisting essentially of:
about 92.5 to about 85 weight percent solid explosive filler selected from the group consisting of cyclotetramethylene tetranitramine, and cyclotrimethylene trinitramine;
from about 7.5 to about 16 weight percent of about a 1 to 1 weight ratio mixture of a liquid plasticizer containing fluorine which is miscible with fluorocarbon polymeric materials and a hydroxyl-terminated fluorocarbon binder selected from the group consisting of: hydroxyl-terminated random perfluorocopolyether having the general structure

HOH$_2$C(CF$_2$O)$_m$(CF$_2$CF$_2$O)$_n$CH$_2$OH where m=n such that the compound has a molecular weight of about 2000,
and the hydroxyl-terminated random copolymer of vinylidene fluoride and hexafluoroproplyene having the general structure

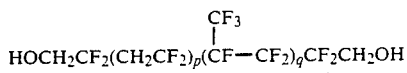
HOCH$_2$CF$_2$(CH$_2$CF$_2$)$_p$(CF—CF$_2$)$_q$CF$_2$CH$_2$OH  (with CF$_3$ branch)

where p—q such that the compound has a molecular weight of about 3600;
an isocyanate curative selected from the group consisting of: isophorone diisocyanate, the biuret trimer of hexamethylene diisocyanate, toluene diisocyanate, hexamethylene diisocyanate, perfluoroether isocyanate and the reaction product of the biuret trimer of hexamethylene diisocyanate and 1,1-dihydroperfluorooctyl alcohol; and
a catalyst selected from the group consisting of dibutyltin dilaurate and ferric acetylacetonate.

7. The explosive of claim 6 wherein said hydroxyl-terminated fluorocarbon binder is hydroxyl-terminated perfluoropolyether and said plasticizer is selected from the group consisting of:

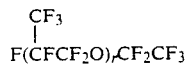
F(CFCF$_2$O)$_r$CF$_2$CF$_3$  (with CF$_3$ branch)

where r=10-60,

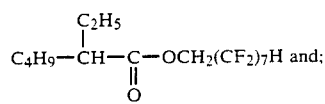
C$_4$H$_9$—CH—C—OCH$_2$(CF$_2$)$_7$H and;  (with C$_2$H$_5$ and =O)

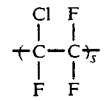

where s=10-60.

8. The explosive of claim 6 wherein said binder is the hydroxyl-terminated random copolyether of vinylidene fluoride and hexafluoropropylene and said plasticizer is selected from the group consisting of bis(flurordinitroethyl) formal and difluoro bis(fluororodinitroethyl) formal.

* * * * *